April 19, 1949.
P. C. MICHEL
2,467,844
MEANS FOR MEASURING THE DIFFERENCE IN MAGNITUDE
OF ALTERNATELY OCCURRING PULSES
Filed March 26, 1946
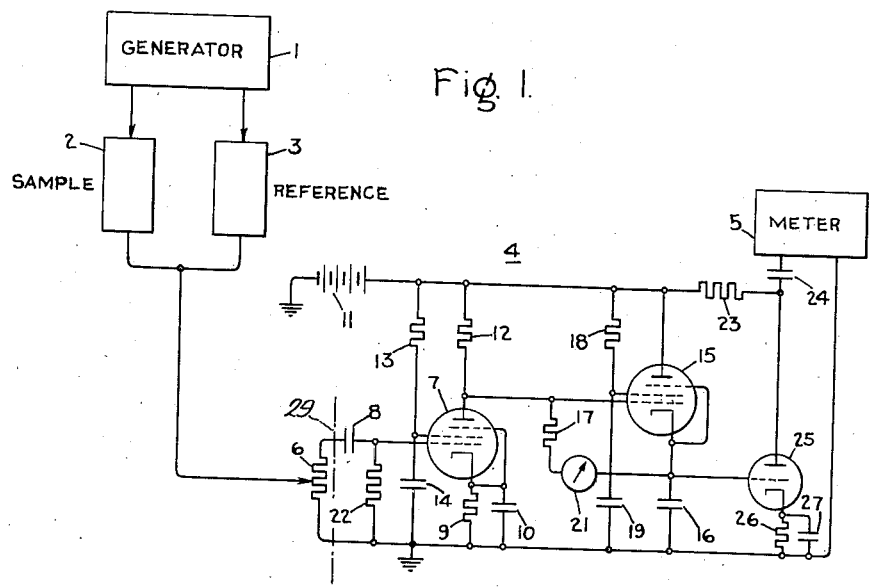
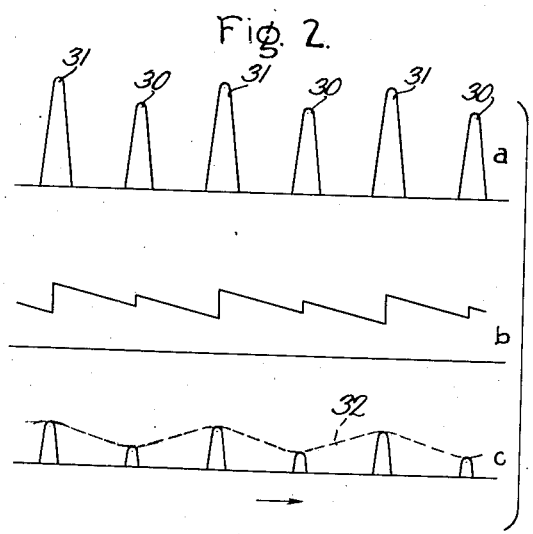
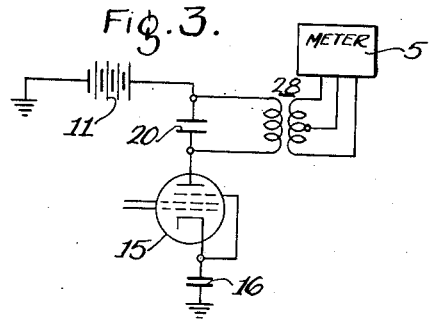
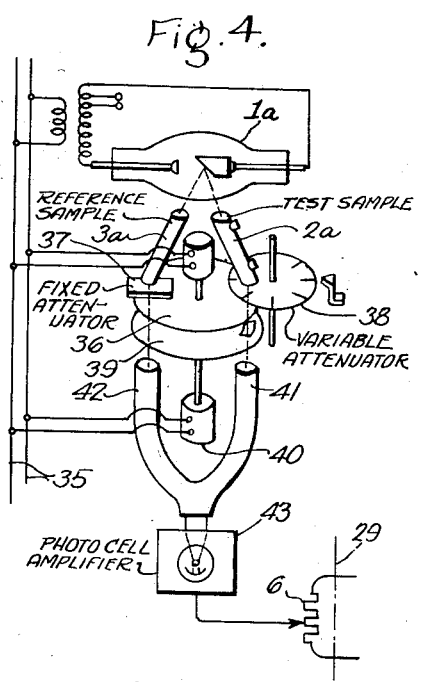
Inventor:
Philip C. Michel,
by Merton D. Mone
His Attorney.

Patented Apr. 19, 1949

2,467,844

UNITED STATES PATENT OFFICE 2,467,844

MEANS FOR MEASURING THE DIFFERENCE IN MAGNITUDE OF ALTERNATELY OCCURRING PULSES

Philip C. Michel, Schenectady, N. Y., assignor to General Electric Company, a corporation of New York Application March 26, 1946, Serial No. 657,307

8 Claims. (Cl. 250—83.3)

My invention relates to wave translation systems and more particularly to methods of and means for measuring the difference in magnitude between two groups of pulses, the pulses of each group occurring alternately with the pulses of the other group.

It is an object of my invention to measure the relative amplitudes of two groups of pulses, the pulses in each group occurring alternately with the pulses of the other group.

It is a further object of my invention to measure the difference in amplitude between two groups of pulses, the pulses of each group occurring alternately with the pulses of the other group in a manner that provides a high degree of sensitivity when pulses of one group are nearly the same magnitude as pulses of the other group and at the same time avoids overloading the system when pulses of one group differ greatly in magnitude from pulses of the other group.

Still another object of my invention is to accomplish the above results in a manner providing an indication that the system is not overloaded.

Briefly, in accordance with one form of my invention, two groups of voltage pulses are applied to the grid circuit of an electron discharge device having its cathode connected to ground through a condenser, the pulses of each group occurring alternately with the pulses of the other group. The condenser, electron discharge device, and asssociated circuits are so proportioned that the condenser charges up nearly to the full value of the applied voltage pulses each time a pulse is applied and discharges at a relatively slow rate during the time interval between pulses. By measuring the component of voltage across the condenser corresponding to one group of voltage pulses, an indication of the relative magnitudes of the two groups is obtained.

In an alternate embodiment of my invention the difference in magnitude between the pulses is measured by a frequency selective circuit connected to be traversed by the space current flowing in the electron discharge device.

The novel features which I believe to be characteristic of my invention are set forth with particularity in the appended claims. My invention itself, however, both as to its organization and method of operation together with further objects and advantages thereof, may best be understood by reference to the following disclosure taken in connection with the accompanying drawings in which Fig. 1 is a partial block diagram and partial schematic diagram showing one embodiment of my invention applied to a measuring system, Fig. 2 shows the method of operation of my invention, Fig. 3 shows an alternate method of taking output voltage from the circuit of Fig. 1, and Fig. 4 shows a modification of that portion of Fig. 1 lying to the left of the vertical dashed line 29.

Referring now to Fig. 1, generator 1 represents a source of energy to be used for testing, and sample 2 and reference 3 represent two paths through which energy from generator 1 may reach the test equipment on a sequential or time selective basis. Signals from sample 2 and reference 3 are fed alternately to measuring circuit 4. For example, as shown in curve $a$ of Fig. 2, the signals may comprise a series of voltage pulses of the same polarity, the even pulses 30 corresponding to signals from generator 1 through one of the paths 2 or 3 and the odd pulses 31 corresponding to signals through the other path. If the energy transmission characteristics of the two paths differ, then the two groups of pulses will have different intensities, as illustrated. The output voltage of circuit 4 is an alternating voltage having amplitude dependent upon the difference in intensity of the two groups of applied voltage pulses. The amplitude of this alternating voltage is indicated by meter 5. Meter 5 therefore directly indicates the difference between the signals supplied through sample 2 and reference 3, or if suitable control means (not shown) be provided, the voltage at meter 5 may cause the transmission characteristics of reference 3 or sample 2 to change in a manner tending to cause the two signals to be of equal magnitude.

Measuring unit 4 consists of a potentiometer 6 which feeds signals to the grid of electron discharge device 7 through condenser 8. Resistance 9 and capacitor 10 provide grid bias for device 7, while battery 11 supplies plate voltage through resistance 12. Resistance 22 provides a leakage path for the charge on condenser 8. Resistance 13 and condenser 14 supply unidirectional screen grid voltage to device 7.

The grid of electron discharge device 15 is directly connected to the plate of device 7 while the cathode of device 15 is connected to ground through condenser 16. Resistance 17 provides a discharge path for condenser 16 since the potential at the anode of device 7 with respect to ground, under the no-signal or quiescent condition, is less than the positive charge normally placed on condenser 16. Resistance 18 and condenser 19 provide unidirectional screen voltage for device 15.

In the circuit of Fig. 1, negative input voltage pulses at the grid of device 7 are amplified and inverted and appear at the grid circuit of device 15 as pulses of positive polarity. Device 15 and the associated circuits are designed to charge condenser 16 nearly to the full value of each pulse as it appears at the grid circuit of that device. Resistance 17 is proportioned to cause condenser 16 to discharge a relatively small amount between cycles so that the voltage across condenser 16 comprises a succession of sawtooth waves, the alternate waves having magnitude proportional to the magnitudes of the alternate voltages appearing at the grid of device 7.

Fig. 2 shows certain characteristics of the operation of the above described system. As previously mentioned, curve $a$ shows a succession of pulses corresponding to the input voltage to device 15. The even pulses 30 correspond to signals from generator 1 through one of paths 2 or 3 whereas the odd pulses 31 corresponding to signals through the other path. Curve $b$ represents the voltage across condenser 16 and comprises a series of sawtooth voltages having peak values corresponding to the peak values of the pulses of curve $a$ and a rate of decrease corresponding to a time constant much greater than the periods between successive pulses. Curve $c$, Fig. 2, shows the current pulse in the space path of tube 15, these pulses representing the current flow required to charge condenser 16 in accordance with the value of the applied voltage pulses.

It is evident from Fig. 2 that the voltage wave appearing across condenser 16 has a component, indicated by the dashed wave 32, which repeats itself every other cycle of the applied pulses. The magnitude of the component is dependent on the difference between the successive voltage pulses, being zero when pulses received from sample 2 and reference 3 are of the same peak voltage and having maximum value when pulses from either sample 2 or reference 3 are of zero amplitude. The magnitude of this component is, therefore, a measure of the degree of balance between sample 2 and reference 3 and by suitable measurement may be used for this purpose. In general, any device sensitive to this half frequency component will serve this purpose.

In order to prevent the measuring system from influencing the charge on condenser 16, it is desirable to isolate these two units. In the circuit of Fig. 1 this is accomplished by electron discharge device 25 connected to amplify the voltage across condenser 16 and actuate meter 5 accordingly. Capacitor 24 serves as a coupling capacitor. Anode voltage for device 25 is derived from resistance 23 and battery 11 and grid bias is obtained from the cathode resistance 26 bypassed by condenser 27.

With the above described circuit, an indication of the magnitude of voltages applied from sample 2 and reference 3 is very desirable for if the weaker voltage pulses charge condenser 16 to the full voltage of battery 11, it is not possible to distinguish between their magnitudes. As a result, the voltage wave across condenser 16 will have no half frequency component and, consequently, the system will appear to be balanced even though it actually may not be balanced. In order to provide an indication that this condition exists, microammeter 21 is connected in series with resistance 17 in the grid circuit of device 15. The microammeter is chosen to read full scale when condenser 16 is charged by all received pulses to the full voltage of battery 11. When either group of pulses fails to charge condenser 16 to the full value of voltage at battery 11, the rate of discharge of that condenser is less than that corresponding to full charge. Accordingly, the reading of microammeter 21 indicates the degree of charge of condenser 16.

For proper operation of the system it is merely necessary to adjust potentiometer 6 until microammeter 21 reads some value below the maximum reading.

An alternate embodiment of my invention is shown in Fig. 3. In this embodiment transformer 28 is provided in the path of current flow through electron discharge device 15. The output voltage of transformer 28 is proportional to the derivative of current flow through the path comprising source 11, device 15, and condenser 16. This current, however, is proportional to the amount of charge of condenser 16 required by successive voltage pulses applied to the grid of device 15 and has wave shape shown in Fig. 2c. The transformer voltage, therefore, represents the magnitudes of the successive voltage pulses and has a frequency component corresponding to the frequency of one group of pulses and dependent on the difference between these successive values. By measuring this component, it is possible to determine the voltage difference between the two groups of pulses.

In order to improve the response characteristic of the circuit shown in Fig. 3, condenser 20 may be added to transformer 28 to cause it to resonate at the frequency corresponding to one group of voltage pulses. This increases the system response and thereby improves performance. In addition, a center tap may be provided on the secondary winding of transformer 28 if the resulting balanced voltages are desired in the measuring circuit.

Although it is not limited thereto, a particular application of my invention is to the method of measuring the attenuation caused by a material in the path of X-rays or other wave energy. In this method, the difference between output signal with a device being tested is compared with the output signal from the same measuring circuit and same generator with a calibrating attenuator. By adjusting the calibrating attenuator until this difference is zero, the effect of the calibrating device is made equal to that of the sample and the effect of the latter may thereby be determined. In an alternate method, the attenuation of the sample plus a calibrated variable attenuator is made equal to that of a fixed calibrated attenuator. A system for carrying out such a method is disclosed in detail and claimed in copending application Serial No. 709,861, filed November 14, 1946, by Theodore A. Rich, and assigned to the same assignee as the present invention.

For completeness of illustration, there is shown in Fig. 4 a somewhat simplified representation of certain essential elements of the system of the aforesaid Rich application, which may be utilized to supply the groups of pulses 30 and 31 to the measuring circuit 4 of Fig. 1. The apparatus of Fig. 4 may be substituted for that portion of Fig. 1 lying to the left of vertical dashed line 29. In the application of this method to X-ray analysis of gases, an X-ray tube 1a supplied with 60 cycle alternating current from supply mains 35 emits X-rays on the positive halves of the voltage supply cycles. These rays reach two separate areas on a rotating fluorescent screen 36 by way of two transmission paths, one through the gaseous medium in which the concentration of some element is to be determined, indicated by tube 2a containing the "Test sample," and the other through a standard tube 3a labeled "Reference sample" and through a calibrated variable attenuator 38 which permits variation in the attenuation over the required concentration range to be detected. A rotating shutter 39 driven by a synchronous motor 40 is interposed in the two X-ray paths so as to pass X-rays from one path at a time and to alternate between paths so that on every second radiation cycle one path is open and during the intervening cycles the other path is open. By detecting the light from the two X-ray paths appearing on fluorescent screen 36, an output voltage wave is produced having even and odd pulses indicating the relative transmission characteristics of the two paths. In Fig. 4, the light from the two paths is alternately directed through light tunnels 41 and 42 upon a photocell amplifier 43. This generates the pulse groups 30 and 31 of Fig. 2 and supplies them to potentiometer 6 in the input circuit of measuring unit 4, as previously described in connection with Fig. 1. When these pulses are all of the same magnitude, the attenuation in the control path is equal to that in the gas being measured and the transmission characteristic of the gas is thereby determined.

A particular advantage of this invention as applied to X-ray analysis resides in the additional weight given the low wavelength X-ray emission. Inasmuch as the amplifier compares the peak values of the emission characteristic, the comparison corresponds to the condition of the X-ray tube at the instant of peak applied voltage. The "hard" or short wavelength X-rays are produced at this instant and the comparison accordingly is based primarily on the conditions for such rays. Hence, the measurement obtained is similar to that which would be achieved by the use of unidirectional excitation voltage at the X-ray tube without the use of rectifiers and other devices required to generate unidirectional excitation voltage.

My invention is not limited to the specific condenser circuit described in detail herein inasmuch as its basic principle resides in alternately charging an energy storage device in accordance with the value of two groups of energy pulses, the pulses of each group occurring alternately with the pulses of the other group, slowly discharging the device between pulses, and measuring either the amount of energy supplied in successive pulses or the variations of stored energy in the device.

While I have shown and described my invention as applied to a particular system of connections and as embodying various devices diagrammatically shown, it will be obvious to those skilled in the art that changes and modifications may be made without departing from my invention. I therefore aim in the appended claims to cover all such changes and modifications as fall within the true spirit and scope of my invention.

What I claim as new and desire to secure by Letters Patent of the United States is:

1. In a system for measuring the relative amplitude of two series of pulses in which the pulses of different series occur alternately in time, the combination of a storage device, means to charge said storage device to an extent dependent upon the intensity of each pulse of both series, means to discharge said storage device over the intervals between successive pulses whereby the charge of said storage device varies cyclically, said cyclical variation having amplitude dependent upon the difference in amplitude of the pulses in said two series, and means to measure the component of said cyclical variations having frequency corresponding to the frequency of one of said series of pulses.

2. In a system for measuring the relative amplitude of two series of pulses in which the pulses of different series occur alternately in time, the combination of a storage device, means to charge said storage device to an extent dependent upon the intensity of each pulse of both series, means to discharge said storage device over the intervals between successive pulses whereby the charge added to said storage device by successive pulses varies cyclically, said cyclical variation having amplitude dependent upon the difference in amplitude of the pulses in said two series, and means to measure the component of said cyclical variations having frequency corresponding to one of said series of pulses.

3. A series circuit including a source of unidirectional electromotive force, an electron discharge device, and a condenser, said device having an anode, a control electrode, and a cathode and said source having polarity tending to cause the anode of said device to be positive with respect to the cathode thereof, means to impress periodic signal pulses between the cathode and control electrode of said device, said pulses all having the same polarity and comprising two groups, the pulses in each group having a common voltage value and occurring alternately in time with pulses of the other group, means to discharge said condenser at a slow rate over the time interval between successive pulses, and output means responsive to the component of voltage across said condenser having frequency corresponding to half the frequency of said pulses.

4. A series circuit including a source of unidirectional electromotive force, an electron discharge device, and a condenser, said device having an anode, a cathode, and a control electrode and said source having polarity tending to cause the anode of said device to be positive with respect to the cathode thereof, means to impress periodic voltage pulses between the cathode and control electrode of said device, said pulses all having the same polarity and comprising two groups, the pulses in each group having a common voltage value and occurring alternately in time with pulses of the other group, means to discharge said condenser at a slow rate during the time interval between successive pulses, and output means responsive to the component of charging current to said condenser having frequency corresponding to half the frequency of said pulses.

5. A series circuit including a source of unidirectional electromotive force, an electron discharge device, and a condenser, said device having an anode, a control electrode, and a cathode and said source having polarity tending to cause the anode of said device to be positive with respect to the cathode thereof, means to impress periodic voltage pulses between the cathode and control electrode of said device, said pulses all having the same polarity and comprising two groups, the pulses in each group having a common voltage value and occurring alternately in time with pulses of the other group, means to discharge said condenser at a slow rate during the time interval between successive pulses, output means responsive to the component of voltage across said condenser having frequency corresponding to half the frequency of said pulses, and means responsive to the discharge current of said condenser to measure the average charge thereon.

6. A series circuit including a source of unidirectional electromotive force, an electron discharge device, and a condenser, said device having an anode, a control electrode, and a cathode and said source having polarity tending to cause the anode of said device to be positive with respect to the cathode thereof, means to impress periodic voltage pulses between the cathode and control electrode of said device, said pulses all having the same polarity and comprising two groups, the pulses in each group having a common voltage value and occurring alternately in time with pulses of the other group, means to discharge said condenser at a slow rate during the time interval between successive pulses, output means responsive to the component of charging current to said condenser having frequency corresponding to half the frequency of said pulses, and means responsive to the discharge current of said condenser to measure the average charge thereon.

7. In a measuring system of the type wherein a characteristic of a test sample is compared to a characteristic of a reference sample; means to produce periodic voltage pulses of magnitude corresponding to said characteristic of said test sample, means to produce periodic voltage pulses alternating in time with said first pulses and of magnitude corresponding to said characteristic of said reference sample, a series circuit including a source of unidirectional electromotive force, an electron discharge device, and a condenser, said device having an anode, a control electrode, and a cathode and said source having polarity tending to cause the anode of said device to be positive with respect to the cathode thereof, means to impress both of said groups of voltage pulses in the same polarity between the cathode and control electrode of said device, means to discharge said condenser at a slow rate during the time interval between successive pulses, and output means responsive to the voltage component across said condenser having frequency corresponding to the frequency of one group of said pulses.

8. In a measuring system of the type wherein a characteristic of a test sample is compared to a characteristic of a reference sample; means to produce periodic voltage pulses of magnitude corresponding to said characteristic of said test sample, means to produce periodic voltage pulses alternating in time with said first voltage pulses and of magnitude corresponding to said characteristic of said reference sample, a series circuit including a source of unidirectional electromotive force, and electron discharge device, and a condenser, said device having an anode, a control electrode, and a cathode and said source having polarity tending to cause the anode of said device to be positive with respect to the cathode thereof, means to impress both of said groups of voltage pulses in the same polarity between the cathode and control electrode of said device, means to discharge said condenser at a slow rate during the time interval between successive pulses; and output means responsive to the component of charging current to said condenser having frequency corresponding to the frequency of one group of said pulses.

PHILIP C. MICHEL.

REFERENCES CITED

The following references are of record in the file of this patent:

UNITED STATES PATENTS

| Number | Name | Date |
| --- | --- | --- |
| 1,602,882 | Chubb | Oct. 12, 1926 |
| 2,097,760 | Failla | Nov. 2, 1937 |
| 2,139,474 | Shepard | Dec. 6, 1938 |
| 2,162,239 | Beuermann | June 13, 1939 |
| 2,208,349 | Ulbright | July 16, 1940 |
| 2,309,560 | Welty | Jan. 26, 1943 |